United States Patent [19]

Bannai et al.

[11] Patent Number: 5,106,316
[45] Date of Patent: Apr. 21, 1992

[54] CLOCK SPRING

[75] Inventors: Hiroyuki Bannai, Furukawa; Hironori Kato, Sendai, both of Japan

[73] Assignee: Alps Electric Co., Ltd., Tokyo, Japan

[21] Appl. No.: 715,162

[22] Filed: Jun. 14, 1991

[30] Foreign Application Priority Data

Jun. 14, 1990 [JP] Japan .................................. 2-62194

[51] Int. Cl.⁵ ............................................ H01R 35/04
[52] U.S. Cl. .................................... 439/164; 439/115
[58] Field of Search ...................... 439/15, 164; 174/86

[56] References Cited

U.S. PATENT DOCUMENTS

| | | |
|---|---|---|
| 3,466,588 | 9/1969 | Bradshaw ............................ 439/164 |
| 4,712,972 | 12/1987 | Nakashima et al. ............. 439/164 X |
| 4,721,469 | 1/1988 | Carlson . | 
| 5,026,289 | 6/1991 | Matsumoto et al. ............. 439/164 X |

Primary Examiner—Eugene F. Desmond
Attorney, Agent, or Firm—Guy W. Shoup; B. Noel Kivlin

[57] ABSTRACT

A clock spring used with, e.g., a steering apparatus of a motor vehicle to establish electrical connection between a stationary member and a movable member by using cables. The clock spring has a stationary member, a movable member fitted to the stationary member so as to be rotatable relative to the same, and cables each having a portion accommodated in a cable housing defined by the stationary and movable members. Two end portions of each cable are respectively fixed to the stationary and movable members and are led out of the cable housing. An improvement achieved by the invention resides in that a group of stationary-side cable accommodation grooves and a group of movable-side cable accommodation grooves are formed by concentric projections in the cable housing so as to face each other, and that cutouts providing a communication through at least one of the groups of stationary-side and movable-side cable accommodation grooves are formed in the projections.

2 Claims, 4 Drawing Sheets

CLOCK SPRING

BACKGROUND OF THE INVENTION

This invention relates to a clock spring used with, for example, a steering apparatus of a motor vehicle to establish electrical connection between a stationary member and a movable member by using cables.

A clock spring is a device for connecting a stationary member and a movable member rotatably fitted to the stationary member through a cable. For example, clock springs of this kind have been used as electrical connection devices for steering apparatuses of motor vehicles.

A type of conventional clock spring is known which has a flat cable having a plurality of threads of conductors sandwiched in a pair of laminated band-like films. The flat cable is loosely accommodated in a coiled state in a cable housing provided between a stationary member and a movable member. One end of the flat cable is fixed to an outer cylindrical wall formed on one of the stationary and movable members, and the other end is fixed to an inner cylindrical wall formed on the other of the stationary and movable members.

In this clock spring, when the movable member is rotated, the flat cable accommodated in the cable housing can be wound around the inner cylindrical wall or unwound toward the outer cylindrical wall according to the direction of rotation of the movable member. No substantial tensile force is applied to the flat cable in a range between the state in which the flat cable is fully wound around the inner cylindrical wall and the state in which it is fully unwound toward the outer cylindrical wall. It is thereby possible to constantly maintain the electrical connection between the stationary and movable members rotated relative to each other.

In the above-described clock spring, since the flat cable is coiled or uncoiled by utilizing the difference between the diameters of the outer and inner cylindrical walls, the length of the flat cable to be used can be reduced if the difference between these diameters is increased, provided that the extents of rotation of the movable member are constant. However, the diameter of the inner cylindrical wall is determined by the diameter of a rotating shaft to which the clock spring is to be attached, e.g., the steering shaft of a vehicle, while the diameter of the outer cylindrical wall cannot be increased substantially, because it is desirable to reduce the overall size of the device. The difference between the diameters of the outer and inner cylindrical walls is therefore limited. Consequently, a very long flat cable is generally required for this kind of clock spring, and the total cost of the clock spring is increased because there is a difficulty in manufacturing such a long flat cable as is well known.

SUMMARY OF THE INVENTION

The present invention has been achieved in consideration of these circumstances, and an object of the present invention is to provide a clock spring in which the necessary length of cables can be greatly reduced and in which the degree of freedom of leading cables is improved.

To achieve this object, according to the present invention, there is provided a clock spring comprising a stationary member, a movable member fitted to the stationary member so as to be rotatable relative to same, cables each having a portion accommodated in a cable housing defined by the stationary and movable members and two end portions respectively fixed to the stationary and movable members and led out of the cable housing, and concentric projections provided in the cable housing to form a group of stationary-side cable accommodation grooves and a group of movable-side cable accommodation grooves facing each other, the projections having cutouts providing a communication through at least one of the groups of stationary-side cable accommodation grooves and movable-side cable accommodation grooves, wherein portions of the cables are wound in one of the groups of stationary-side and movable-side cable accommodation grooves, other portions of the cables are reversely coiled in the other of the groups of stationaryside and movable-side cable accommodation grooves, and one end of each cable is led to the outside through the corresponding one of the cutouts.

When the movable member is rotated relative to the stationary member, lengths of cable corresponding to half the extent of rotation of the movable member are payed out from one group of cable accommodation grooves into the other group of cable accommodation grooves. The electrical connection between the movable and stationary members can be maintained by changing the coiled state of each cable.

BRIEF DESCRIPTION OF THE DRAWINGS

FIG. 1 is a schematic perspective view of the whole clock spring;

FIG. 2 is a partially cutaway plan view;

FIG. 3 is a longitudinal sectional view;

FIG. 4 is a bottom view of the upper case;

FIG. 5 is an illustration of a flexible cable; and

FIG. 6 is a diagram of the movement of flexible cables.

DESCRIPTION OF THE PREFERRED EMBODIMENTS

An embodiment of the present invention will be described below with reference to the accompanying drawings.

Figure 1:
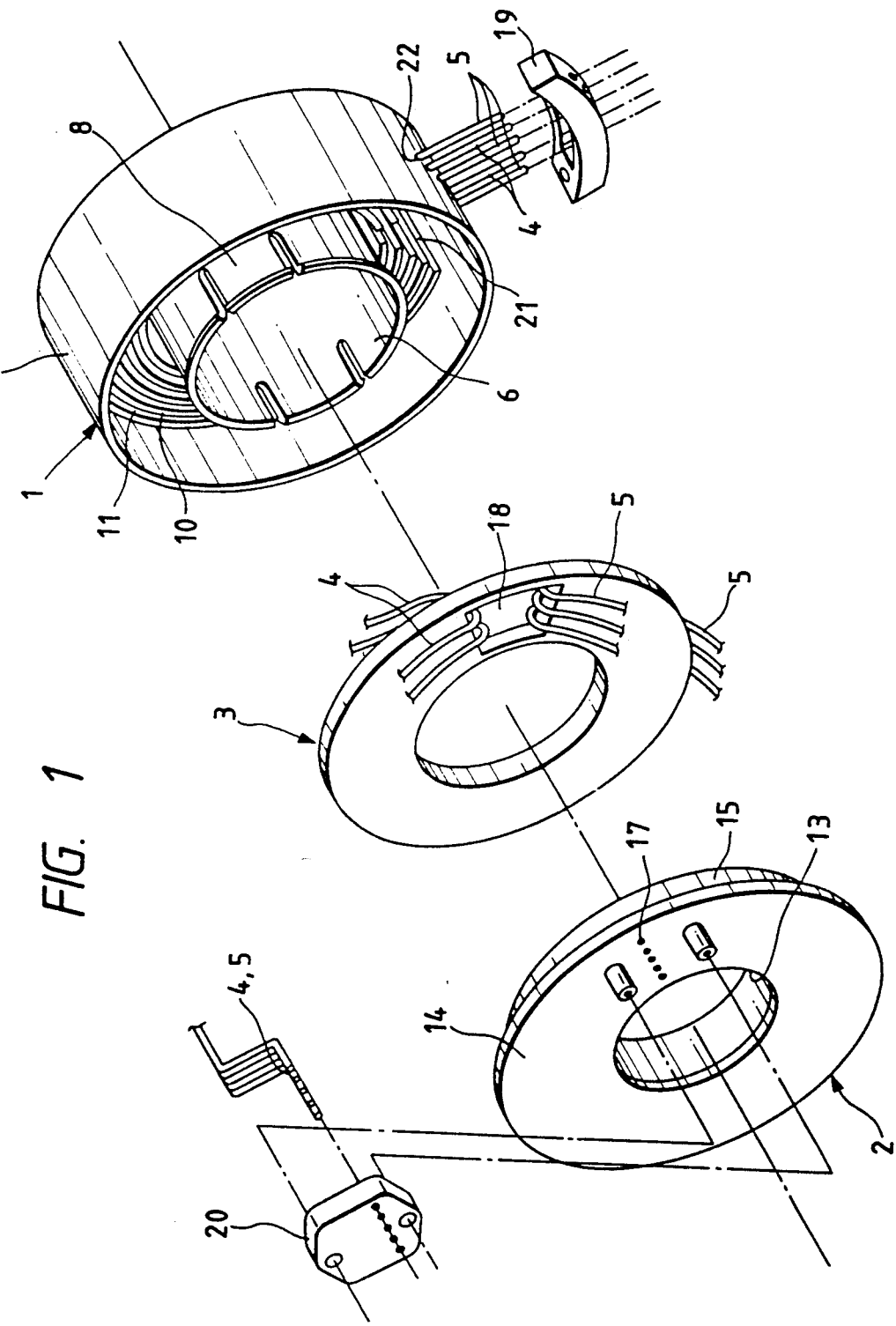
FIGS. 1 to 6 are diagrams of a clock spring in accordance with an embodiment of the present invention.
Figure 2:
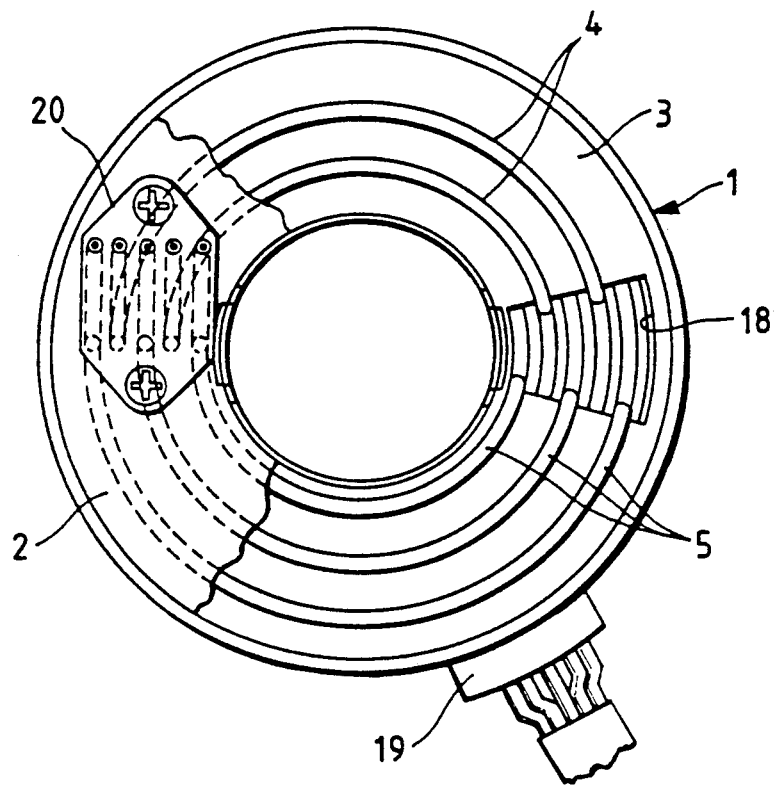
Figure 3:
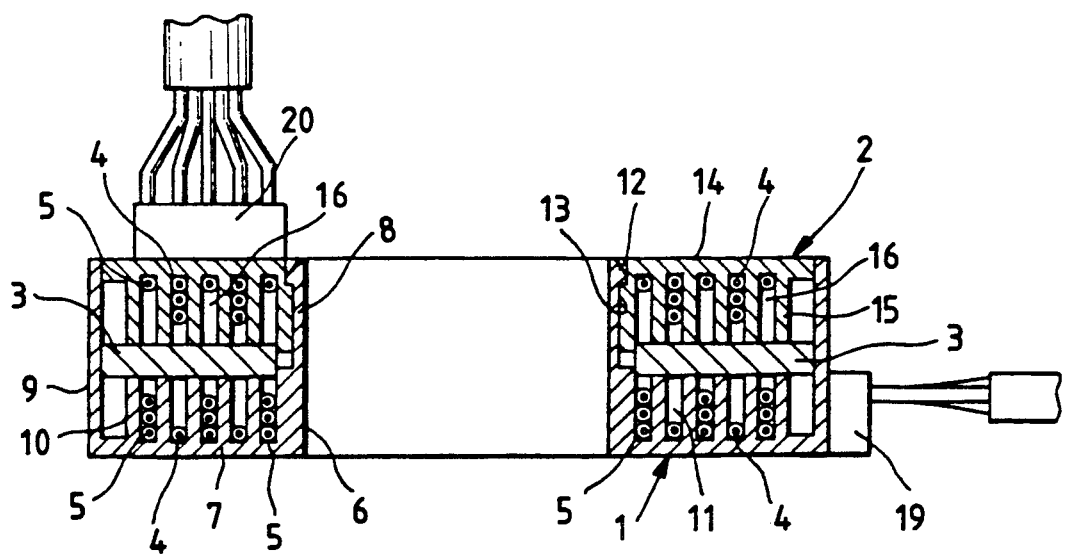

Referring to FIGS. 1 to 3, the clock spring is mainly constituted by a lower case 1, an upper case 2 supported on the lower case 1 so as to be rotatable relative to the same, a spacer 3 rotatably interposed between the two cases 1 and 2, and flexible cables 4 and 5 coiled in the two cases 1 and 2.

Figure 4:
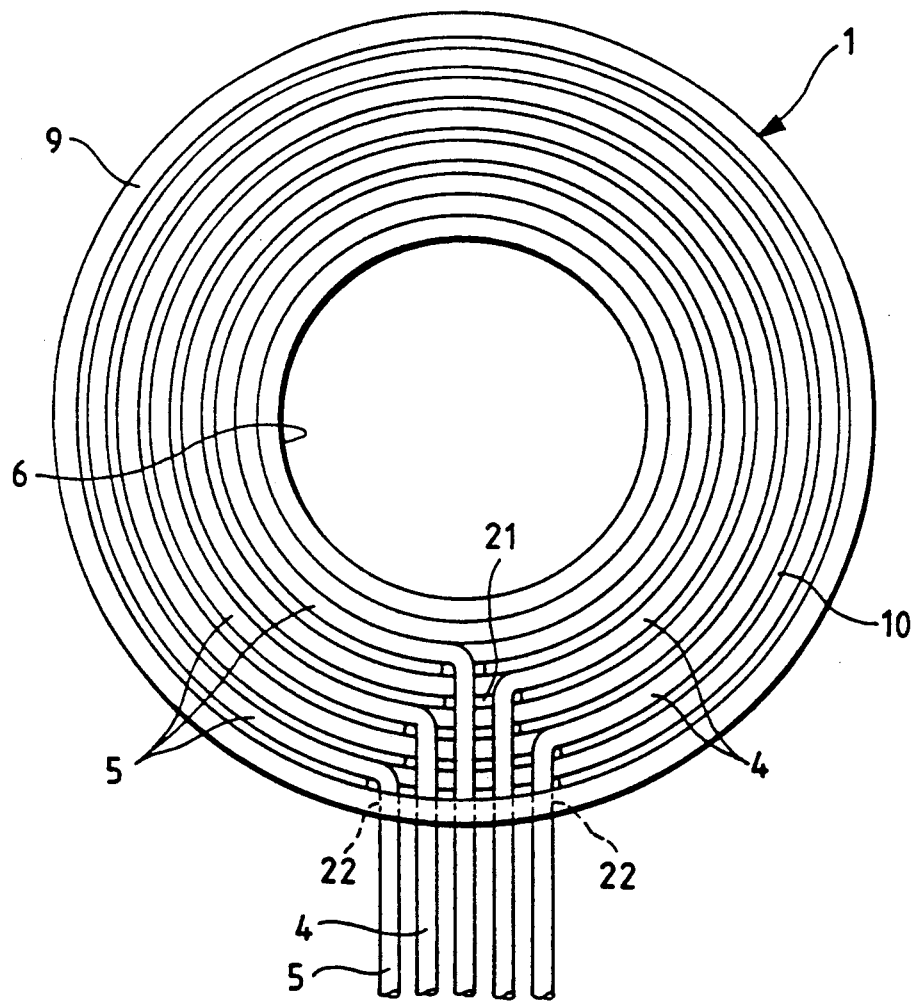

The lower case 1 has a bottom plate 7 in which a central opening 6 is formed and inner and outer circumferential walls 8 and 9 perpendicularly extending from the inner and outer circumferential ends of the bottom plate 7. The lower case 1 has a cylindrical shape generally opened at its top and closed at its bottom. A plurality of threads of projections 10 are formed on the bottom plate 7 concentrically with the central opening 6 so as to extend perpendicularly from the bottom plate 7. A plurality (five threads in this embodiment) of first cable accommodation grooves 11 are formed between the projections 10. As shown in FIG. 4, the projections 10 have cutouts 21 which provide a communication through the first cable accommodation grooves 11. The same number of cable outlet holes 22 as the first cable accommodation grooves 11 are formed in a portion of the outer circumferential wall 9 facing the outermost cutout 21. Flange-like portions 12 are formed at the upper end of the inner circumferential wall 8.

The upper case 2 has a ceiling plate 14 having a central opening 13 and is rotatably connected to the lower case 1 by being fitted around internal surfaces of the inner circumferential wall 8 inside the flange-like portions 12 in a snap connection manner. A plurality of threads of projections 15 are formed on the ceiling plate 14 concentrically with the central opening 13 so as to extend perpendicularly from the ceiling plate 14. A plurality (five threads in this embodiment) of concentric second cable accommodation grooves 16 are formed between the projections 15. The second cable accommodation grooves 16 and the first cable accommodation grooves 11 face each other with the below-described spacer 3 interposed therebetween. Cable outlet holes 17 are also formed in portions of the ceiling plate 14 corresponding to the bottoms of the second cable accommodation grooves 16.

The spacer 3 is formed of a material such as a molded synthetic resin having a good sliding property, and has a generally ring-like shape with a cut opening 18. The spacer 3 is rotatably interposed between the first cable accommodation grooves 11 of the lower case 1 and the second cable accommodation grooves 16 of the upper case 2.

The flexible cables 4 and 5 are formed of cables called wire harness, i.e., conductor wires covered with an insulating material. In this embodiment, five wire harness cables are used. These flexible cables consist of (two) first flexible cables 4 and (three) second flexible cables 5 coiled in opposite directions. The first flexible cables 4 are coiled counterclockwise in the second and fourth ones (counted from the inner end) of the first cable accommodation grooves 11 of the lower case 1, and are coiled clockwise in the opposed second cable accommodation grooves 16 of the upper case 2. That is, one end of each flexible cable 4 extending from the upper case 2 into the lower case 1 through the opening 18 while being turned through about a half round thereat is coiled in the corresponding first cable accommodation groove li, while the other end is coiled in the corresponding second cable accommodation groove 16. The second flexible cables 5 are coiled clockwise in the first, third and fifth ones (counted from the inner end) of the first cable accommodation grooves 11, and are coiled counterclockwise in the opposed second cable accommodation grooves 16. That is, one end of each flexible cable 5 extending from the upper case 2 into the lower case 1 through the opening 18 while being turned through about a half round thereat is coiled in the corresponding first cable accommodation groove 11 of lower case 1, while the other end is coiled in the corresponding second cable accommodation groove 16. As shown in FIG. 4, one end of each flexible cable 4 or 5 is led to the outside of the lower case 1 through the cutouts 21 formed in the projections 10 and the corresponding cable outlet hole 22 formed in the outer circumferential wall 9, is fixed in a holder 19 attached to a side surface of the outer circumferential wall 9 and is connected to a lower connector (not shown) while being combined with the ends of the other cables 4 and 5. The other end of each of the flexible cables 4 and 5 is led through the cable outlet hole 17 to the outside of the upper case 2, is fixed by being cranked in a holder 20 attached to the upper surface of the ceiling plate 14 of the upper case 2 and is connected to an upper connector (not shown) while being combined with the ends of the other cables 4 and 5.

Figure 5:
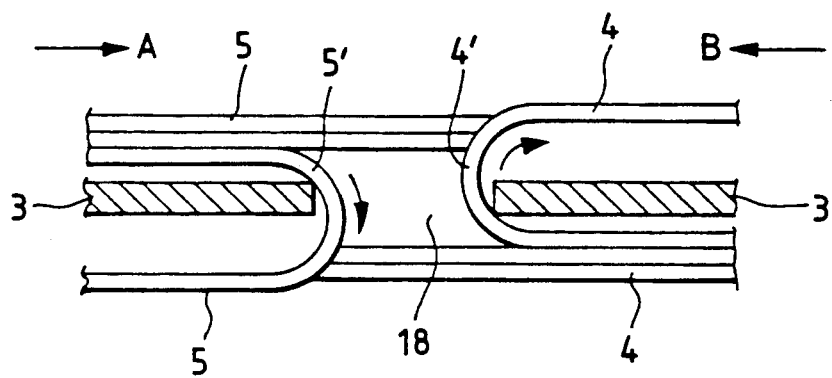
Figure 6:
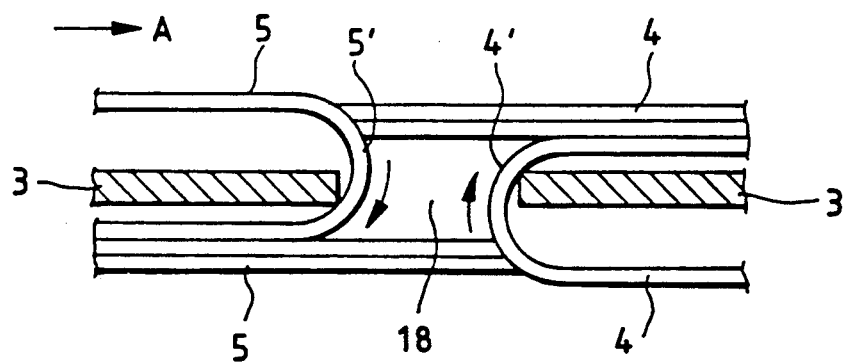

Next, the operation of the clock spring in accordance with the above-described embodiment will be described belo with specific reference to FIGS. 5 and 6 with respect to a case in which the lower case 1 is used as a stationary member while the upper case 2 is used as a movable member. In FIGS. 5 and 6, one of the flexible cables 4 and one of the flexible cables 5 are shown schematically while the lower and upper cases 1 and 2, the spacer 3 and other members are omitted.

FIG. 5 shows a state in which the greater part of each first flexible cable 4 is coiled in the first cable accommodation groove 11 of the lower case 1 while the greater part of each second flexible cable 5 is coiled in the second accommodation groove 16 of the upper case 2.

When the upper case 2 is rotated, for example, counterclockwise (in the direction of arrow A) to a predetermined extent from the state shown in FIG. 5, turned portions 4' and 5' of the first and second flexible cables 4 and 5 are moved in the direction of arrow A to an extent corresponding to half the extent of rotation of the upper case 2, a length of first flexible cable 4 equal to the extent of this movement is payed out of the lower case 1 into the second cable accommodation groove 16 of the upper case 2, and the same length of second flexible cable 5 is payed out of the upper case 2 into the first cable accommodation groove 11 of the lower case 1. During this operation, the turned portion 4' of the first flexible cable 4 contacts a right edge (as viewed in FIG. 6) of the opening 18 of the spacer 3 so that the spacer 3 is driven and rotated in the direction of arrow A to an extent corresponding to half the extent of rotation of the upper case 2, and so that the opening 18 rotates by following the turned portions 4' and 5' of the flexible cables 4 and 5.

Thus, when the upper case 2 is rotated in the direction of arrow A to make N revolutions, the turned portions 4' and 5' and the spacer 3 make N/2 revolutions in the direction of arrow A as shown in FIG. 6, so that a length of flexible cable 5 corresponding to N/2 rounds is payed out from the second cable accommodation groove 16 through the opening 18 to be coiled in the first cable accommodation groove 11 while a length of flexible cable 4 corresponding to N/2 rounds is payed out from the first cable accommodation groove 11 through the opening 18 to be coiled in the second cable accommodation groove 16.

The upper case 2 can be rotated in the direction of arrow A until the whole of the second flexible cable 5 coiled in the second accommodation groove 16 of the upper case 2 is coiled in the first cable accommodation groove 11 of the lower case 1, that is, the upper case 2 can make revolutions twice as much as the number of windings of flexible cable 5 in the upper case 2. When the second flexible cable 5 is fully coiled in the first cable accommodation groove, the whole of the first flexible cable 4 payed out from the first cable accommodation groove 11 is coiled in the second cable accommodation groove 16.

When the upper case 2 is rotated clockwise (in the direction of arrow B) to a predetermined extent from a state in which reverse to the above-mentioned state, in which the greater part of each first flexible cable 4 is coiled in the second cable accommodation groove 16 of the upper case 2 while the greater part of each second flexible cable 5 is coiled in the first accommodation groove 11 of the lower case 1, turned portion 5' of the second flexible cable 5 contacts a left edge of the opening 18 to drive and rotate the spacer 3 in the direction of arrow B, so that turned portions 4' and 5' of the first and second flexible cables 4 and 5 and the spacer 3 are rotated in the direction of arrow B an extent corresponding to half the extent of rotation of the upper case 2. A length of second flexible cable 5 equal to the extent of movement of the spacer 3 is thereby payed out of the first cable accommodation groove 11 of the lower case 1 through the opening 18 to be coiled in the second cable accommodation groove 16 of the upper case 2, and the same length of first flexible cable 4 is payed out of the second cable accommodation groove 16 through the opening 18 to be coiled in the first cable accommodation groove 11.

In the above-described embodiment, only lengths of flexible cables 4 and 5 may be provided such that each flexible cable 4 or 5 forms windings corresponding to about half the necessary amount of rotation may be provided. It is thus possible to greatly reduce the length of flexible cables 4 and 5 in comparison with the conventional device. Moreover, a wire harness can be used as flexible cables 4 and 5 to reduce the total cost of the clock spring. Since each flexible cable 4 or 5 used is short, the diameter of the cable housing can be reduced, which effect is advantageous in reducing the overall size of the clock spring.

The first and second cable accommodation grooves 11 and 16 concentrically formed in the opposed surfaces of the lower and upper cases 1 and 2 at equal pitches and the spacer 3 in the form of a flat plate interposed between the cable accommodation grooves 11 and 16 prevent the flexible cables 4 and 5 from entangling with each other and also prevent each flexible cable 4 or 5 from entangling itself between the first and second cable accommodation grooves 11 and 16, thereby making it possible to smoothly coil and uncoil the flexible cables 4 and 5.

The first and second flexible cables 4 and 5 are coiled in the opposite directions, so that when the upper case 2 is rotated, the spacer 3 is driven and rotated by one of the groups of flexible cables (4 or 5), thus achieving a very simple mechanism for driving the spacer 3. In this respect as well, the size of the clock spring can be reduced.

Further, the first and second flexlble cables 4 and 5 coiled in the first cable accommodation grooves 11 of the lower case 1 are led outside the outer circumferential wall 9 after being bent at the cutouts 21 formed in the projections 10, thereby enabling the lower case to have a simplified lower surface configuration without any special holder or connector. At the time of assembly of the clock spring on a steering apparatus of a vehicle, there is no interference between lead portions of the first and second flexible cables 9 and 5 and various components of the steering apparatus disposed below the lower case 1, e.g., switches. The degree of freedom of leading the flexible cables 4 and 5 out of the lower case 1 is thereby improved.

In the above-described embodiment, the lower case 1 is used as a stationary member while the upper case 2 is used as a movable member. However, the relationship between these members may be reversed; the upper case 2 may be used as a stationary member and the lower case 1 as a movable member.

In the above-desoribed embodiment, first and seoond cable accommodation grooves 11 and 16 are inte9rally formed on the lower and upper cases 1 and 2, respectively. Alternatively, projections 10 and 15 may be integrally formed on the upper and lower surfaces of the spacer 3 to provide the cable accommodation grooves 11 and 16 on the spacer 3, or only the oable accommodation grooves 11 or 16 may be provided on the spacer 3. In the above-described embodiment, five flexible cables 4 and 5, i.e., two first flexible cables 4 and three second flexible cables 5 are coiled in the same numbers of first and second cable accommodation grooves 11 and 16. Needless to say, the selection of these numbers is not exclusive. It is not always necessary to coil a plurality of flexible cables 4 and 5 in opposite directions; they can be coiled in the same direction. In such a case, the spacer can be driven and rotated by means of a rolling member such as a gear or roller contacting the lower and upper cases 1 and 2.

In the above-described embodiment, one end of each flexible cable 4 or 5 is laterally led to the outside through the outer circumferential wall 9 of the lower case 1. However, similar cutouts may also be formed in the projections 15 of the upper case 2 to laterally lead both the two ends of each flexible cable 4 or 5 out of the cases 1 and 2.

In accordance with the present invention, as described above, the necessary length of the cables can remarkably be reduced and the cables can be led out through a side portion of the stationary or movable member. It is thus possible to provide a clock spring which can be reduced in price while being improved in cable layout freedom.

What is claimed is:

1. A clock spring comprising:
   a stationary member;
   a movable member fitted to said stationary member so as to be rotatable relative to same;
   cables each having a portion accommodated in a cable housing defined by said stationary and movable members and two end portions respectively fixed to said stationary and movable members and led out of said cable housing; and
   concentric projections provided in said cable housing to form a group of stationary-side cable accommodation grooves and a group of movable-side cable accommodation grooves facing each other, said projections having cutouts providing a communication through at least one of said groups of stationary-side cable accommodation grooves and movable-side cable accommodation grooves;
   wherein portions of said cables are wound in one of said groups of stationary-side and movable-side cable accommodation grooves, other portions of said cables are reversely coiled in the other of said groups of stationary-side and movable-side cable accommodation grooves, and one end of each of said cables is led to the outside through the corresponding one of said cutouts.

2. A clock spring according to claim 1, wherein each of said cables is led out of the clock spring outwardly in a radial direction of same by passing through the corresponding one of said cutouts.

* * * * *